Nov. 27, 1956    G. D. OLSSON    2,772,327
DAMPING MEANS FOR SELECTING BARS IN CROSSBAR SWITCHES
Filed Dec. 28, 1951
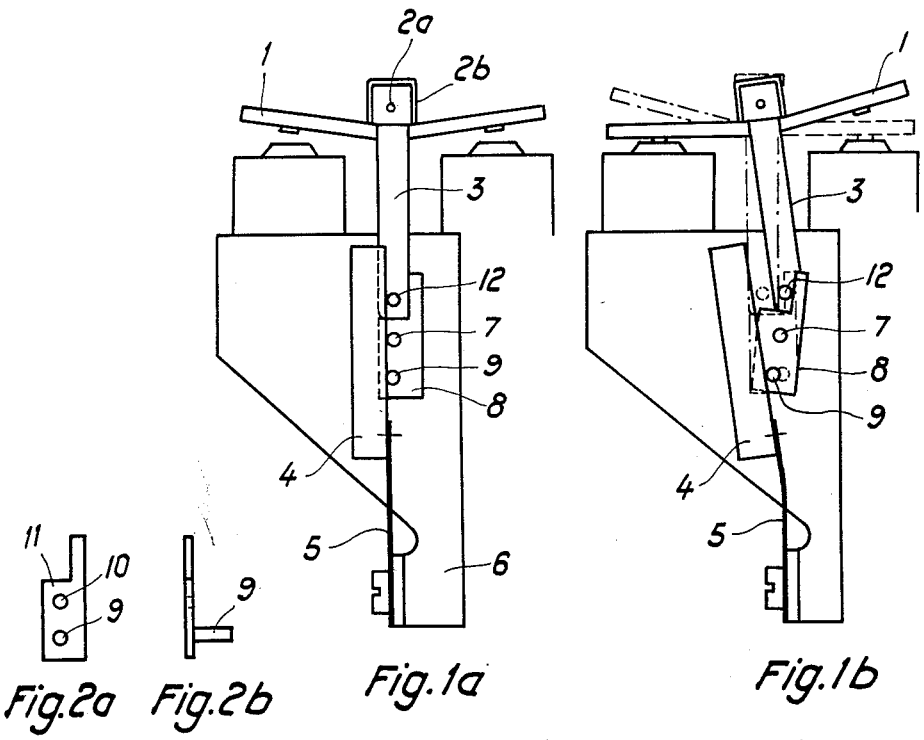
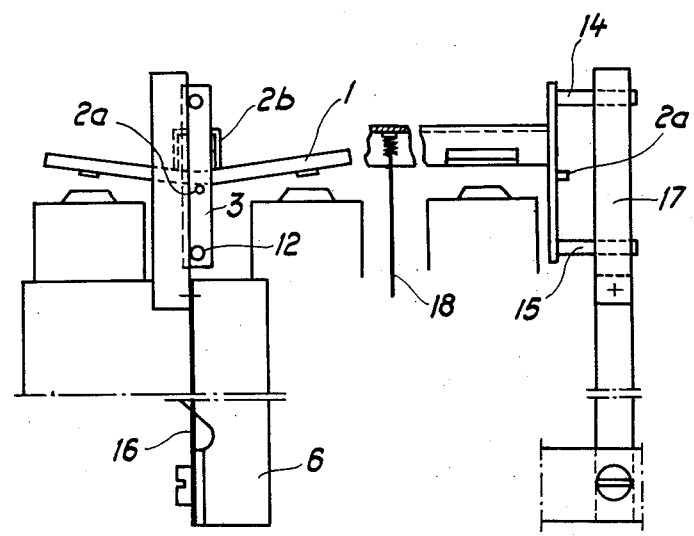
Gunnar Daniel Olsson
INVENTOR

United States Patent Office 2,772,327
Patented Nov. 27, 1956

2,772,327

DAMPING MEANS FOR SELECTING BARS IN CROSSBAR SWITCHES

Gunnar Daniel Olsson, Stockholm, Sweden

Application December 28, 1951, Serial No. 263,809

5 Claims. (Cl. 179—27.54)

On the operation of selecting bars carrying selecting fingers and armatures in crossbar switches injurious vibrations will occur when these parts assume their rest position after the armature has been released. In most cases the rest position is a mid-position from which the selecting bar may be rotated by a predetermined angle in either direction so as to place its selecting fingers under the contact spring groups of either of two rows of such spring groups situated on either side of the bar. Attempts have been made to reduce these vibrations in various manners, for instance by providing two brake weights having restoring springs at either side of a pin in such manner that the restoring arm of the bar acts upon these weights on the release of the armature. However, it has not been possible to bring the bars and/or armatures to an immediate stop by these means, but the damping has always taken a relatively long time, and in known devices there is always a risk that the bar on release might continue its movement by its mid-position just at the moment a holding magnet becomes operated, so that a spring group will be unintentionally selected and operated.

The present invention makes it possible to brake immediately the bars and armatures in their mid-position. The arrangement according to the invention is provided with at least one brake weight attached to a restoring spring, and is characterized by a rotatable double-armed member arranged at one end of the bar or a member forming together with the arm of the bar a doublearmed member which is counteracted on the return of the bar by at least one resilient brake weight in such manner that the two arms of the double-armed member serve alternately as restoring and braking arm respectively, the said member and the brake weight being moved in opposite direction on the braking operation.

The arrangement and its mode of operation will be described more in particular in conjunction with the accompanying drawing on which two embodiments of the invention are shown.

Figures 1a and 1b show an embodiment of the invention in side view in mid-position of the selecting bar and two operated positions respectively.

Figures 2a and 2b show a lever forming part of the arrangement according to Figures 1a and 1b in side view and in front view respectively.

Figures 3a and 3b show another embodiment of the invention in side view and in front view respectively. The selecting bar is shown in its mid-position.

In Figures 1a and 1b the armatures 1 of a selecting bar of a crossbar switch are shown pivoted on a shaft 2a which is parallel to the bar, designated 2b. At one short side of the armatures an arm 3 is fixed which carries at its lower end a pin 12 extending at right angles to the arm. A flat spring 5 with a brake weight 4 is attached to a supporting member 6 in parallel to the arm 3. The supporting member 6 also carries a pin 7 on which a lever 8 having a hole 10 (Fig. 2a) is pivoted. The shape of the lever 8 will appear more clearly from Figs. 2a and 2b on which a pin 9 attached to the lower portion of the lever, the hole 10 and a recess (notch) 11 are shown.

In the embodiment according to Figures 3a and 3b a part of a crossbar switch is shown having the same kind of armatures 1, shaft 2a and bar 2b as the device according to Figures 1a and 1b. However, in this embodiment the arm 3 is so attached in relation to the bar 2b that it turns with the latter around a central axis. As will be seen in Figure 3a the arm 3 is provided at its upper half with a pin 14 at right angles to the arm, and at its lower half with a similar pin 15. The supporting member 6 which is similar to member 6 in Figures 1a and 1b, has attached to it a restoring spring 16 to the other end of which a brake weight 17 is fixed in such manner that in normal position it abuts against the pins 14 and 15 on the arm 3—13. 18 in Fig. 3b is a selecting finger.

The arrangement works in the following manner:

In non-operated condition the armatures 1 are in the mid-position shown in Figure 1a. If the left armature is attracted, the arm 3 is rotated to the right around the shaft 2a as shown by heavy lines in Figure 1b. The pin 12 on the arm 3 then strikes the recess 11 of lever 8 and turns the upper portion of this lever to the right about the pin 7. On this movement the lower portion of lever 8 urges by pin 9 the brake weight 4 together with spring 5 to the left. On release of the left armature 1 the brake weight 4 is pushed by the spring pressure to the right again and actuates pin 9 on lever 8 so that the upper portion of lever 8 with the recess 11 is turned to the left again about the shaft 7. The recess then urges the pin 12 on arm 3 to the left until the mid-position is reached in which position the arm 3 is effectively stopped and remains without performing any vibrations.

If the right armature 1 is attracted, the arm is rotated to the left about the shaft 2a as shown in broken lines in Figure 1b, and the brake weight 4 is pushed by the pin 12 in the same direction. On release the weight is urged to the right again by the spring and actuates pin 9 on the lever 8 so that it is rotated to the right. The recess 11 on lever 8 strikes pin 12 on arm 3 and restores the arm immediately to the mid-position.

The braking action in the embodiment according to Figures 3a and 3b is brought about thus, that either pin 15 or pin 14 urges the upper or the lower portion respectively of the brake weight 17 in outward direction against the force exerted by a restoring spring 16 which is attached to the supporting member 6. The brake weight immediately urges the arm 3 back into mid-position without further vibrations occurring.

The arrangement according to the invention can, of course, be applied to crossbar switches of varying size and design.

The lever 8 can be applied to the pin 7 by means of a sleeve instead of the hole 10. The brake weight 4 or 17 and the arm 3 respectively can be designed in other way than that shown especially with respect to those parts intended to abut against each other.

I claim:

1. A crossbar switch comprising a support having a selecting bar selectively rotatable in either of two directions from a neutral position upon energization of either of two oppositely arranged electromagnets, a pair of spaced stop members, means supporting said stop members for swingable movement substantially in a common plane, means operatively connected with said selecting bar and operatively engaging said supporting means for actuation of the latter so as to cause said stop members to move in mutually opposite directions on rotation of the selecting bar in a respective one of its rotating directions, and a spring urged braking device including a massive brake weight supported in the path of movement in the respective directions of the said stop members, the selecting bar on rotation in either of the two rotating directions from its neutral position urging one of said stop members against said braking device to actuate said brake weight in the respective direction.

2. A switch according to claim 1, in which said braking device comprises a leaf spring secured to said support, and a massive weight secured to said leaf spring.

3. A device according to claim 1 in which said braking device comprises a flexible cantilever secured to said support, and a massive weight on said cantilever.

4. A switch according to claim 1, in which said supporting means comprise an arm fixed to said selecting bar, one of said stop members being fixed to said arm, said support having a lever pivoted thereto in the path of said one stop member, the other stop member being fixed to said lever, the pivot for said lever lying between said stop members.

5. A switch according to claim 1, in which said supporting means comprise an arm fixed to said selecting bar, one of said stop members being fixed to each end of said arm.

References Cited in the file of this patent

UNITED STATES PATENTS

| | | |
|---|---|---|
| 2,317,469 | Mallina | Apr. 27, 1943 |
| 2,354,660 | Bellamy | Aug. 1, 1944 |
| 2,577,067 | Arthur | Dec. 4, 1951 |